United States Patent
Rozenbaum et al.

(10) Patent No.: US 12,095,793 B2
(45) Date of Patent: Sep. 17, 2024

(54) ACCELERATED DATA MOVEMENT BETWEEN DATA PROCESSING UNIT (DPU) AND GRAPHICS PROCESSING UNIT (GPU) TO ADDRESS REAL-TIME CYBERSECURITY REQUIREMENTS

(71) Applicant: Mellanox Technologies, Ltd., Yokneam (IL)

(72) Inventors: Chen Rozenbaum, Beer Yakov (IL); Shauli Arazi, Tel-Aviv (IL); Bartley Richardson, Alexandria, VA (US)

(73) Assignee: Mellanox Technologies, Ltd., Yokneam (IL)

( * ) Notice: Subject to any disclaimer, the term of this patent is extended or adjusted under 35 U.S.C. 154(b) by 248 days.

(21) Appl. No.: 17/720,216

(22) Filed: Apr. 13, 2022

(65) Prior Publication Data
US 2023/0336574 A1    Oct. 19, 2023

(51) Int. Cl.
*H04L 9/40*     (2022.01)
*G06N 3/08*     (2023.01)

(52) U.S. Cl.
CPC ........... *H04L 63/1425* (2013.01); *G06N 3/08* (2013.01)

(58) Field of Classification Search
CPC .... H04L 63/1425; G06N 3/08; G06N 3/0442; G06N 3/0464
See application file for complete search history.

(56) References Cited

U.S. PATENT DOCUMENTS

| | | | |
|---|---|---|---|
| 11,374,838 B1* | 6/2022 | Finkelshtein | H04L 43/0876 |
| 2018/0248904 A1* | 8/2018 | Villella | G06N 3/047 |
| 2020/0073882 A1* | 3/2020 | Guggilla | G06N 5/02 |
| 2020/0106793 A1* | 4/2020 | Vanamali | H04L 63/1433 |
| 2020/0412634 A1* | 12/2020 | Hong | H04L 43/04 |
| 2022/0030017 A1* | 1/2022 | Infante-Lopez | H04L 63/1425 |
| 2022/0318383 A1* | 10/2022 | Huang | G06N 3/08 |

* cited by examiner

*Primary Examiner* — Anh Nguyen
(74) *Attorney, Agent, or Firm* — Lowenstein Sandler LLP

(57) ABSTRACT

Apparatuses, systems, and techniques for detecting that a host device is subject to a malicious network attack using a machine learning (ML) detection system are described. A computing system includes a graphics processing unit (GPU) and an integrated circuit with a network interface, and a hardware acceleration engine. The integrated circuit hosts a hardware-accelerated security service to extract features from network data and metadata from the hardware acceleration engine and sends the extracted features to the GPU. Using the ML detection system, the GPU determines whether the host device is subject to a malicious network attack using the extracted features. The GPU can send an enforcement rule to the integrated circuit responsive to a determination that the host device is subject to the malicious network activity.

8 Claims, 7 Drawing Sheets

ACCELERATED DATA MOVEMENT BETWEEN DATA PROCESSING UNIT (DPU) AND GRAPHICS PROCESSING UNIT (GPU) TO ADDRESS REAL-TIME CYBERSECURITY REQUIREMENTS

TECHNICAL FIELD

At least one embodiment pertains to processing resources used to perform and facilitate operations for detecting whether a host device is subject to a malicious network attack. For example, at least one embodiment pertains to processors or computing systems used to provide and enable a data processing unit (DPU) and a graphics processing unit (GPU) to determine, using a machine learning (ML) detection system, whether a host device is subject to a malicious network attack based on features extracted from network data and metadata of the DPU, according to various novel techniques described herein.

BACKGROUND

Network security, which involves protecting a communications network and the devices that connect to it from various threats, remains a challenging problem. There are many different types of possible network attacks, including but not limited to distributed denial of service attacks, man-in-the-middle attacks, unauthorized accesses, and so forth. The strategies and tactics employed by malicious actors continue to evolve. Existing techniques for protecting network communications can be improved.

BRIEF DESCRIPTION OF DRAWINGS

Various embodiments in accordance with the present disclosure will be described with reference to the drawings, in which.

DETAILED DESCRIPTION

Figure 1A:
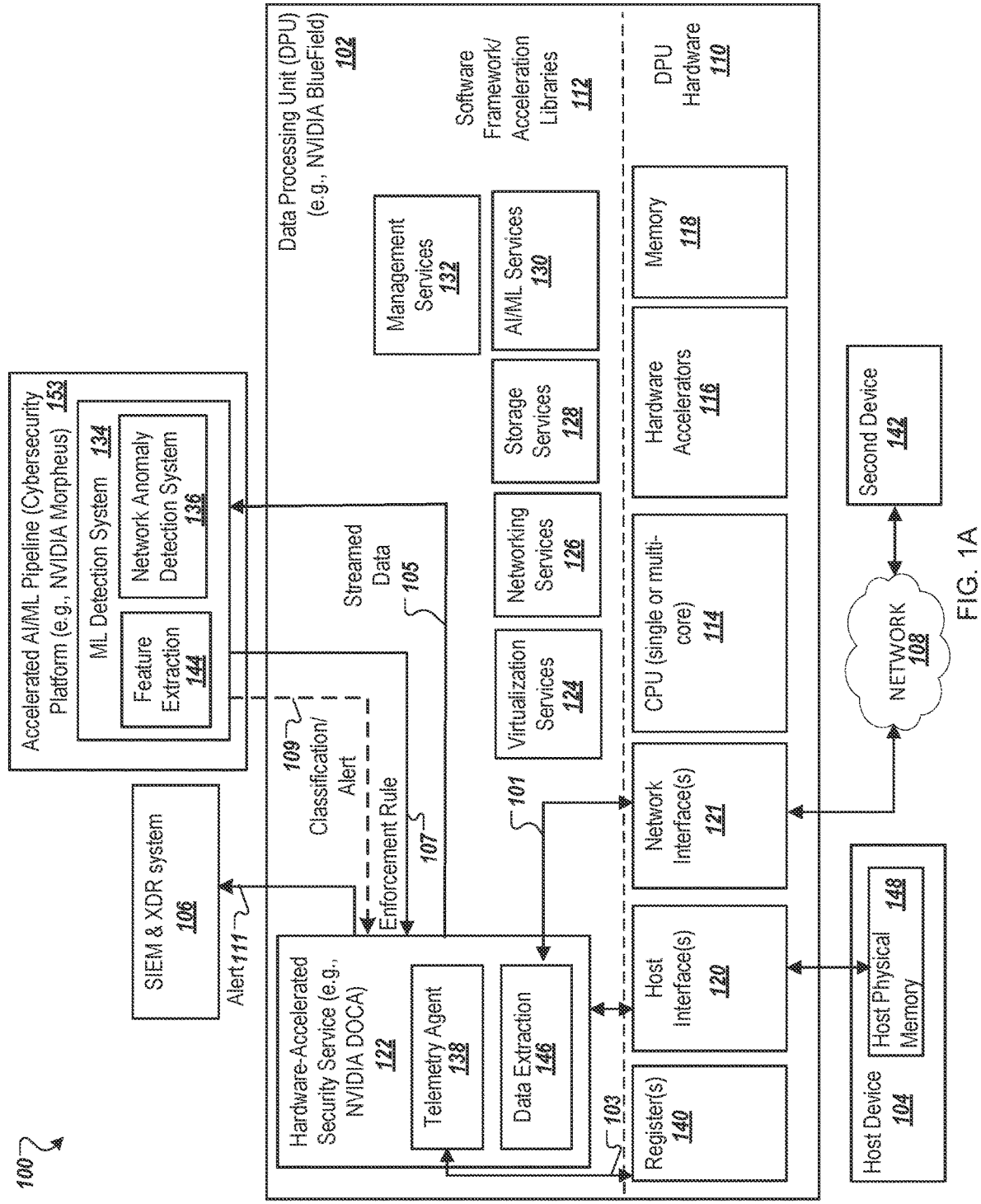
FIG. 1A is a block diagram of an example system architecture, according to at least one embodiment.

Data center security includes a wide range of technologies and solutions to protect a data center from external and internal threats or attacks. A data center is a facility that stores different devices such as switches, routers, load balancers, firewalls, servers, networked computers, storage, network interface cards (NICs), DPUs, GPUs, and other resources as part of the information technology (IT) infrastructure. For private companies moving to the cloud, data centers reduce the cost of running their own centralized computing networks and servers. Data centers provide services, such as storage, backup and recovery, data management, networking, security, orchestration, or the like. Because data centers hold sensitive or proprietary information, such as customer data or intellectual property, servers must be secured and protected all the time from known and unknown network attacks, malware, malicious activity, and the like. Data centers are complex and include many types of devices and services. Security components and advanced technologies can be used to protect devices and services.

One type of cybersecurity requirement is to prevent malicious network attacks, which have become a big concern in today's interconnected world. One conventional solution for detecting network attacks is signature-based detection. Signature-based detection is based on past experience and extensive knowledge of each attack. Conventional signature-based detection systems fail to address the increased variability of today's cyberattacks and have several disadvantages. The conventional system fails to detect new attacks since signature-based detection requires a new signature for each new attack. The signatures must be maintained and updated continuously to support new attacks. The convention system can be highly time-consuming and expensive due to the demand for security experts required for creating, testing, and verifying the signatures. There can also be time constraints to these solutions since there can be a large amount of time between the discovered attack and a signature created, tested, and verified for deployment.

Aspects and embodiments of the present disclosure address the above and other deficiencies by hosting a hardware-accelerated security service on an acceleration hardware engine of an integrated circuit (e.g., DPU) and a cybersecurity platform with one or more accelerated machine learning pipelines on a GPU to determine whether the host device is subject to a malicious network attack. In particular, the DPU can extract feature data from the network traffic and feature data from registers of the DPU and stream the feature data to the accelerated machine learning pipeline to determine whether a host device is subject to a malicious network attack based on the feature data. Studies of recent network attacks show that using machine learning for network attack detection by learning the patterns of the network behaviors can prevent the advanced techniques used by attackers in today's interconnected world. Machine learning involves training a computing system—using training data—to identify features in data that may facilitate detection and classification. Training can be supervised or unsupervised. Machine learning models can use various computational algorithms, such as decision tree algorithms (or other rule-based algorithms), artificial neural networks, or the like. During an inference stage, new data is input into a trained machine learning model, and the trained machine learning model can classify items of interest using features identified during training. Anomaly detection and enforcement techniques based on DPU for networking filtering and acceleration, GPU-based framework for AI, can provide network protection for data centers in today's interconnected world. In addition, modern data centers and cloud infrastructures contain heterogeneous compute capabilities, including ARM and GPU-native infrastructure. Although they execute on different operating systems and often have different deployment requirements, aspects of the present disclosure can provide fast and exact coordination between the sensor (e.g., DPU with ARM cores) and other edge-based and centralized accelerated compute environments (GPU cores).

Aspects and embodiments of the present disclosure can provide a hardware-accelerated security service that can extract features from network data directed to a host device and data stored in registers of the acceleration hardware engine and send the features to the cybersecurity platform to determine whether the host device is subject to the malicious network attack. The hardware-accelerated security service receives an enforcement rule from the cybersecurity platform responsive to a determination by the cybersecurity platform that the host device is subject to a malicious network attack. The hardware-accelerated security service performs an action, associated with the enforcement rule, on subsequent network traffic directed to the host device. The hardware-accelerated security service can operate on a DPU and be an agentless hardware product that inspects the network data directed to the host device. In at least one embodiment, the hardware-accelerated security service is the NVIDIA DOCA. Alternatively, other hardware-accelerated security services can be used. In some cases, the cybersecurity platform detects malicious network activity during an attack and can provide an enforcement rule in response to protect the host device from the attack. The integrated circuit can be a DPU. The DPU can be a programmable data center infrastructure on a chip. The integrated circuit can include a network interface operatively coupled to a central processing unit (CPU) to handle network data path processing, and the CPU can control path initialization and exception processing.

Aspects and embodiments of the present disclosure can provide a first agent (e.g., NVIDIA DOCA Flow Inspector) of the hardware-accelerated security service and a second agent (e.g., NVIDIA DOCA Telemetry agent). The first agent can leverage the acceleration hardware engine (e.g., DPU hardware) to offload and filter network traffic based on predefined filters using the hardware capabilities of the acceleration hardware engine. The second agent can extract telemetry data from embedded counters (or other registers) on the acceleration hardware engine, combine the telemetry data with the filtered network traffic to the cybersecurity platform. The filtered network traffic can be structured data that can be streamed with the counters metadata to the cybersecurity platform for analysis using accelerated memory accessing methodologies, as described herein. The cybersecurity platform can process a large volume of data on the GPU coupled to the acceleration hardware engine and provide immediate and dynamic protection by sending enforcement network rules back to the acceleration hardware engine (e.g., DPU). The cybersecurity platform can detect threats or attacks using anomaly detection methodologies. The cybersecurity platform can provide feedback results to the accelerated hardware engine (e.g., DPU hardware) to enforce and block the malicious activity or any other types of cyberattacks. This feedback can potentially change, or otherwise alter, the streamed data being sent to the cybersecurity platform to refine the feedback results further. The flow inspector and telemetry agent hosted on the DPU and the cybersecurity platform hosted on the GPU can provide a full solution for traffic filtering, counters extraction, and data stream to the GPU for machine learning-based anomaly detection. Once the machine learning-based anomaly detection identifies a network attack, mitigation rules can be used to configure the DPU to block the attack immediately.

System Architecture

FIG. 1A is a block diagram of an example system architecture 100, according to at least one embodiment. The system architecture 100 (also referred to as "system" or "computing system" herein) includes an integrated circuit, labeled DPU 102, a host device 104, a security information and event management (SIEM) or extended detection and response (XDR) system 106. The system architecture 100 can be part of a data center and include one or more data stores, one or more server machines, and other components of data center infrastructure. In implementations, network 108 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof In at least one embodiment, DPU 102 is integrated as a System on a Chip (SoC) that is considered a data center infrastructure on a chip. In at least one embodiment, DPU 102 includes DPU hardware 110 and software framework with acceleration libraries 112. The DPU hardware 110 can include a CPU 114 (e.g., a single-core or multi-core CPU), one or more hardware accelerators 116, memory 118, one or more host interfaces 120, and one or more network interfaces 121. The software framework and acceleration libraries 112 can include one or more hardware-accelerated services, including hardware-accelerated security service 122 (e.g., NVIDIA DOCA), hardware-accelerated virtualization services 124, hardware-accelerated networking services 126, hardware-accelerated storage services 128, hardware-accelerated artificial intelligence/machine learning (AI/ML) services 130, and hardware-accelerated management services 132. In at least one embodiment, DPU 102 is coupled to an accelerated AI/ML pipeline 153. In at least one embodiment, the accelerated AI/ML pipeline 153 can be a GPU coupled to the DPU 102. In at least one embodiment, the accelerated AI/ML pipeline 153 can host an ML detection system 134 that includes one or more ML detection models trained to determine whether a host device 104 is subject to a malicious network attack. In at least one embodiment, the ML detection system 134 is the NVIDIA MORPHEUS cybersecurity platform. Accelerated AI/ML Pipeline 153 can perform pre-processing operations, inferences, post-processing operations, actions, or any combination thereof. Accelerated AI/ML Pipeline 153 can be a combination of hardware and software, such as the NVIDIA EXG platform and software for accelerating AI/ML operations on the NVIDIA EXG platform. For example, accelerated AI/ML Pipeline 153 can provide advantages in accelerating processes up to 60 times compared to a CPU. Accelerated AI/ML Pipeline 153 can also provide an advantage of a number of inferences that can be done in parallel (e.g., up to millions of inferences in parallel). Additional details of ML detection system 134 are described below with respect to FIG. 1B. The host device 104 can include host physical memory 148. The host physical memory 148 can include one or more volatile and/or non-volatile memory devices that are configured to store the data of host device 104. In at least one embodiment, ML detection system 134 includes a network-anomaly detection system 136 and other detection systems, such as a ransomware detection system, a malicious URL detection system, a DGA detection system, and optionally other malware detection systems.

In at least one embodiment, hardware-accelerated security service 122 includes data extraction logic 146 (e.g., DOCA Flow Inspector) that extracts network data 101 from network traffic received over the network 108 via one or more network interface(s) 121. The network data 101 can be received over network 108 from a second device 142. The second device 142 can be the initiator of the malicious network attack. In at least one embodiment, the hardware-accelerated security service 122 receives a copy of the network data 101 (e.g., a mirrored copy of the network data 101 directed to the host device 104). The data extract logic 146 can be configured by a configuration file that specifies what type of data should be extracted from the network data 101. The configuration file can specify one or more filters that extract for inclusion or remove from inclusion specified types of data from the network data 101. Since the network data can be a copy, the network traffic that does not meet the filtering criteria can be discarded or removed. The network traffic that meets the filtering criteria can be structured and streamed to the cybersecurity platform for analysis. The extraction logic 146 can generate a data structure with the extracted data. The data structure can be any type of data structure, such as a struct, an object, a message, or the like. For example, the configuration file can specify that all HyperText Transport Protocol (HTTP) traffic be extracted from the network data 101. The configuration file can specify that all traffic on port 80, port 443, and/or port 22 should be extracted from the network data 101 for analysis. A large percentage of attacks target these three ports: SSH-22/TCP, HTTPS-443/TCP, and HTTP-80/TCP.

In at least one embodiment, hardware-accelerated security service 122 includes a telemetry agent 138 that extracts metadata 103 from one or more registers 140 of the DPU hardware 110. In at least one embodiment, the telemetry agent 138 can be configured or programmed by a configuration file (same or different configuration file than the extraction logic 146) that specifies what metadata should be extracted from the DPU's hardware, such as from embedded counters, registers, or the like. For example, the configuration file can specify which values from counters, registers, or the like, should be extracted by the telemetry agent to be streamed with the extracted network data. Some metadata 103 can be associated or related to the network data 101. Some metadata 103 can be associated or related to the underlying hardware and not related to the network traffic. In at least one embodiment, the telemetry agent 138 can also send the data structure with the extracted network data 101 and extracted metadata 103 to the cybersecurity platform (e.g., accelerated AI/ML pipeline(s) 153).

In at least one embodiment, the telemetry agent 138 combines the extracted network data 101 and the metadata 103 into streamed data 105. The telemetry agent 138 sends the streamed data 105 to the ML detection system 134 to determine whether the host device 104 is subject to the malicious network attack. Responsive to a determination by the ML detection system 134 that the host device 104 is subject to the malicious network attack, the ML detection system 134 sends an enforcement rule 107 to the DPU 102. The hardware-accelerated security service 122 can perform an action, associated with the enforcement rule 149, on subsequent network traffic directed to the host device 104 from the second device 142. In at least one embodiment, the ML detection system 134 can output an indication 109 of classification by ML detection system 134. Indication 109 can be an indication of a malicious network attack (or other network anomalies) on the host device 104. In at least one embodiment, ML detection system 134 can send indication 109 to hardware-accelerated security service 122, and hardware-accelerated security service 122 can send an alert 111 to SIEM or XDR system 106. Alert 151 can include information about the malicious network attack. In at least one embodiment, ML detection system 134 can send indication 109 to SIEM or XDR system 106, in addition to or instead of sending indication 109 to hardware-accelerated security service 122.

In at least one embodiment, data extraction logic 146 has feature extraction logic to extract one or more features and send the extracted features to ML detection system 134 instead of the extracted data. For example, data extraction logic 146 can extract HTTP data, and the telemetry agent 138 can extract corresponding metadata 103 from the DPU hardware registers and counters. The data extraction logic 146 can generate the stream data 105 and send it to the ML detection system 134. In another embodiment, the ML detection system 134 includes feature extraction logic 144 to extract a set of features from the streamed data 105. The streamed data can be raw extracted data from the hardware-accelerated security service 122. In at least one embodiment, extracted features are input into a network-anomaly detection system 136. In at least one embodiment, the network-anomaly detection system 136 includes a classification model trained to classify the streamed data 105 as malicious or benign.

In at least one embodiment, feature extraction logic 144 can extract some features from network data 101 in the streamed data 105 and tokenize these features into tokens. The feature extraction logic 144 can extract numerical features from the telemetry data (i.e., metadata 103) in the streamed data. The tokens and the numerical features can be combined into a feature set. In at least one embodiment, anomaly detection system 136 includes a classification model trained to classify the extracted features as malicious or benign using the set of features. In at least one embodiment, the classification model includes an embedding layer, a Long Short-Term Memory (LSTM) layer, and a neural network layer (e.g., a fully-connected neural network layer). The embedding layer receives the tokens as an input sequence of tokens representing the network data 101 and generates an input vector based on the input sequence of tokens. The LSTM layer is trained to generate an output vector based on the input vector. The neural network layer is trained to classify the set of features as malicious or benign using the output vector from the LSTM layer and the numeric features of the telemetry data. Additional details of the binary classification model are described below with respect to FIG. 3A.

In at least one embodiment, the binary classification model is a convolutional neural network (CNN) with an embedding layer to receive the tokens as an input sequence of tokens representing the extracted network data 101 and generate an input vector based on the input sequence of tokens and values from the metadata 103. The CNN is trained to classify the network data 101 as being malicious or benign using the input vector from the embedding layer.

It should be noted that, unlike a CPU or GPU, DPU 102 is a new class of programmable processor that combines three key elements, including, for example: 1) an industry-standard, high-performance, software-programmable CPU (single-core or multi-core CPU), tightly coupled to the other SoC components; 2) a high-performance network interface capable of parsing, processing and efficiently transferring data at line rate, or the speed of the rest of the network, to GPUs and CPUs; and 3) a rich set of flexible and programmable acceleration engines that offload and improve applications performance for AI and machine learning, security, telecommunications, and storage, among others. These capabilities can enable an isolated, bare-metal, cloud-native computing platform for cloud-scale computing. In at least one embodiment, DPU 102 can be used as a stand-along embedded processor. In at least one embodiment, DPU 102 can be incorporated into a network interface controller (also called a Smart Network Interface Card (SmartNIC)) used as a server system component. A DPU-based network interface card (network adapter) can offload processing tasks that the server system's CPU normally handles. Using its processor, a DPU-based SmartNIC may be able to perform any combination of encryption/decryption, firewall, transport control protocol/Internet Protocol (TCP/IP), and HyperText Transport Protocol (HTTP) processing. SmartNICs can be used for high-traffic web servers, for example.

In at least one embodiment, DPU 102 can be configured for traditional enterprises' modern cloud workloads and high-performance computing. In at least one embodiment, DPU 102 can deliver a set of software-defined networking, storage, security, and management services (e.g., 122-132) at a data-center scale with the ability to offload, accelerate, and isolate data center infrastructure. In at least one embodiment, DPU 102 can provide multi-tenant, cloud-native environments with these software services. In at least one embodiment, DPU 102 can deliver data center services of up to hundreds of CPU cores, freeing up valuable CPU cycles to run business-critical applications. In at least one embodiment, DPU 102 can be considered a new type of processor that is designed to process data center infrastructure software to offload and accelerate compute load of virtualization, networking, storage, security, cloud-native AI/ML services, and other management services (e.g., 122-132).

In at least one embodiment, DPU 102 can include connectivity with packet-based interconnects (e.g., Ethernet), switched-fabric interconnects (e.g., InfiniBand, Fibre Channels, Omni-Path), or the like. In at least one embodiment, DPU 102 can provide a data center that is accelerated, fully programmable, and configured with security (e.g., zero-trust security) to prevent data breaches and cyberattacks. In at least one embodiment, DPU 102 can include a network adapter, an array of processor cores, and infrastructure offload engines with full software programmability. In at least one embodiment, DPU 102 can sit at an edge of a server to provide flexible, secured, high-performance cloud and AI workloads. In at least one embodiment, DPU 102 can reduce the total cost of ownership and increase data center efficiency. In at least one embodiment, DPU 102 can provide the software framework and acceleration libraries 112 (e.g., NVIDIA DOCA™) that enables developers to rapidly create applications and services for DPU 102, such as security services 122, virtualization services 124, networking services 126, storage services 128, AI/ML services 130, and management services 132. In at least one embodiment, ML detection system 134 is implemented in the AI/ML services 130. In another embodiment, ML detection system 134 is implemented on one or more hardware accelerators 116 or other components of the DPU hardware 110. In at least one embodiment, the software framework and acceleration libraries 112 makes it easy to leverage hardware accelerators of DPU 102 to provide data center performance, efficiency, and security. In at least one embodiment, the ML detection system 134 is implemented in a GPU coupled to the DPU 102. The GPU can include the one or more accelerated AI/ML pipeline 153 described above.

In at least one embodiment, DPU 102 can provide networking services 126 with a virtual switch (vSwitch), a virtual router (vRouter), network address translation (NAT), load balancing, and network virtualization (NFV). In at least one embodiment, DPU 102 can provide storage services 128, including NVME™ over fabrics (NVMe-oF™) technology, elastic storage virtualization, hyper-converged infrastructure (HCI) encryption, data integrity, compression, data deduplication, or the like. NVM Express™ is an open logical device interface specification for accessing nonvolatile storage media attached via the PCI Express® (PCIe) interface. NVMe-oF™ provides an efficient mapping of NVMe commands to several network transport protocols, enabling one computer (an "initiator") to access block-level storage devices attached to another computer (a "target") very efficiently and with minimum latency. The term "Fabric" is a generalization of the more specific ideas of network and input/output (I/O) channel. It essentially refers to an N:M interconnection of elements, often in a peripheral context. The NVMe-oF™ technology enables the transport of the NVMe command set over a variety of interconnection infrastructures, including networks (e.g., Internet Protocol (IP)/Ethernet) and also I/O Channels (e.g., Fibre Channel). In at least one embodiment, DPU 102 can provide hardware-accelerated security services 122 using Next-Generation Firewall (FGFW), Intrusion Detection Systems (IDS), Intrusion Prevention System (IPS), a root of trust, micro-segmentation, distributed denial-of-service (DDoS) prevention technologies, and ML detection using data extraction logic 146 and ML detection system 134. NGFW is a network security device that provides capabilities beyond a stateful firewall, like application awareness and control, integrated intrusion prevention, and cloud-delivered threat intelligence. In at least one embodiment, the one or more network interfaces 121 can include an Ethernet interface (single or dual ports) and an InfiniBand interface (single or dual ports). In at least one embodiment, the one or more host interfaces 120 can include a PCIe interface and a PCIe switch. In at least one embodiment, the one or more host interfaces 120 can include other memory interfaces. In at least one embodiment, CPU 114 can include multiple cores (e.g., up to 8 64-bit core pipelines) with L2 cache per two one or two cores and L3 cache with eviction policies support for double data rate (DDR) dual in-line memory module (MINIM) (e.g., DDR4 DIMM support), and a DDR4 DRAM controller. Memory 118 can be on-board DDR4 memory with error correction code (ECC) error protection support. In at least one embodiment, CPU 114 can include a single core with L2 and L3 caches and a DRAM controller. In at least one embodiment, the one or more hardware accelerators 116 can include a security accelerator, a storage accelerator, and a networking accelerator. In at least one embodiment, ML detection system 134 is hosted by the security accelerator. In at least one embodiment, the security accelerator can provide a secure boot with hardware root-of-trust, secure firmware updates, Cerberus compliance, Regular expression (RegEx) acceleration, IP security (IPsec)/Transport Layer Security (TLS) data-in-motion encryption, AES-GCM 128/256-bit key for data-at-rest encryption (e.g., Advanced Encryption Standard (AES) with ciphertext stealing (XTS) (e.g., AES-XTS 256/512), secure hash algorithm (SHA) 256-bit hardware acceleration, Hardware public key accelerator (e.g., Rivest-Shamir-Adleman (RSA), Diffie-Hellman, Digital Signal Algorithm (DSA), ECC, Elliptic Curve Cryptography Digital Signal Algorithm (EC-DSA), Elliptic-curve Diffie-Hellman (EC-DH)), and True random number generator (TRNG). In at least one embodiment, the storage accelerator can provide BlueField SNAP—NVMe™ and VirtIO-blk, NVMe-oF™ acceleration, compression and decompression acceleration, and data hashing and deduplication. In at least one embodiment, the network accelerator can provide remote direct memory access (RDMA) over Converged Ethernet (RoCE) RoCE, Zero Touch RoCE, Stateless offloads for TCP, IP, and User Datagram Protocol (UDP), Large Receive Offload (LRO), Large Segment Offload (LSO), checksum, Total Sum of Squares (TSS), Residual Sum of Squares (RSS), HTTP dynamic streaming (HDS), and virtual local area network (VLAN) insertion/stripping, single root I/O virtualization (SR-IOV), virtual Ethernet card (e.g., VirtIO-net), Multi-function per port, VMware NetQueue support, Virtualization hierarchies, and ingress and egress Quality of Service (QoS) levels (e.g., 1K ingress and egress QoS levels). In at least one embodiment, DPU 102 can also provide boot options, including secure boot (RSA authenticated), remote boot over Ethernet, remote boot over Internet Small Computer System Interface (iSCSI), Preboot execution environment (PXE), and Unified Extensible Firmware Interface (UEFI).

In at least one embodiment, DPU 102 can provide management services, including a 1 GbE out-of-band management port, network controller sideband interface (NC-SI), Management Component Transport Protocol (MCTP) over System Management Bus (SMBus), and Monitoring Control Table (MCT) over PCIe, Platform Level Data Model (PLDM) for Monitor and Control, PLDM for Firmware Updates, Inter-Integrated Circuit (I2C) interface for device control and configuration, Serial Peripheral Interface (SPI) interface to flash, embedded multi-media card (eMMC) memory controller, Universal Asynchronous Receiver/Transmitter (UART), and Universal Serial Bus (USB).

In at least one embodiment, hardware-accelerated security service 122 is an adaptive cloud security service that provides real-time network visibility, detection, and response to cyber threats. In at least one embodiment, hardware-accelerated security service 122 acts as the monitoring or telemetry agent for DPU 102 or a cybersecurity platform (e.g., 153 in FIG. 1B), such as the NVIDIA Morpheus platform, which is an AI-enabled, cloud-native cybersecurity platform. The NVIDIA Morpheus platform is an open application framework that enables cybersecurity developers to create AI/ML pipelines 153 for filtering, processing, and classifying large volumes of real-time data, allowing customers to continuously inspect network and server telemetry at scale. The NVIDIA Morpheus platform can provide information security to data centers to enable dynamic protection, real-time telemetry, and adaptive defenses for detecting and remediating cybersecurity threats.

Previously, users, devices, data, and applications inside the data center were implicitly trusted, and perimeter security was sufficient to protect them from external threats. In at least one embodiment, DPU 102, using hardware-accelerated security service 122, can define the security perimeter with a zero-trust protection model that recognizes that everyone and everything inside and outside the network cannot be trusted. Hardware-accelerated security service 122 can enable network screening with encryption, granular access controls, and micro-segmentation on every host and for all network traffic. Hardware-accelerated security service 122 can provide isolation, deploying security agents in a trusted domain separate from the host domain. If a host device is compromised, this isolation by hardware-accelerated security service 122 prevents the malware from knowing about or accessing hardware-accelerated security service 122, helping to prevent the attack from spreading to other servers. In at least one embodiment, the hardware-accelerated security service 122 described herein can provide host monitoring, enabling cybersecurity vendors to create accelerated intrusion detection system (IDS) solutions to identify an attack on any physical or virtual machine. Hardware-accelerated security service 122 can feed data about application status to SIEM or XDR system 106. Hardware-accelerated security service 122 can also provide enhanced forensic investigations and incident response.

As described above, attackers attempt to exploit breaches in security control mechanisms to move laterally across data center networks to other servers and devices. Hardware-accelerated security service 122 described herein can enable security teams to shield their application processes, continuously validate their integrity, and, in turn, detect malicious activity. If an attacker terminates the security control mechanism's processes, hardware-accelerated security service 122 described herein can mitigate the attack by isolating the compromised host device, preventing the malware from accessing confidential data or spreading to other resources.

Conventionally, security tools run in the same host domain as the malware. So, stealthy malware can employ hiding techniques from the host device, enabling the malware to silently take over and tamper with agents and operating system (OS). For example, if anti-virus software is running on a host device that needs to continue operating or is not suspended, hardware-accelerated security service 122 described herein actively monitors the process to determine any anomalies, malware, or intrusion as described in more detail in the various embodiments described below. The malware runs in the host domain and hardware-accelerated security service 122 runs in a separate domain than the host domain.

Host device 104 may be a desktop computer, a laptop computer, a smartphone, a tablet computer, a server, or any suitable computing device capable of performing the techniques described herein. In some embodiments, host device 104 may be a computing device of a cloud-computing platform. For example, host device 104 may be a server machine of a cloud-computing platform or a component of the server machine. In such embodiments, host device 104 may be coupled to one or more edge devices (not shown) via network 108. An edge device refers to a computing device that enables the communication between computing devices at the boundary of two networks. For example, an edge device may be connected to host device 104, one or more data stores, one or more server machines via network 108, and may be connected to one or more endpoint devices (not shown) via another network. In such an example, the edge device can enable communication between host device 104, one or more data stores, one or more server machines, and one or more client devices. In other or similar embodiments, host device 104 may be an edge device or a component of an edge device. For example, host device 104 may facilitate communication between one or more data stores, one or more server machines connected to host device 104 via network 108, and one or more client devices connected to host device 104 via another network.

In still other or similar embodiments, host device 104 can be an endpoint device or a component of an endpoint device. For example, host device 104 may be, or may be a component of, devices, such as televisions, smart phones, cellular telephones, data center servers, data DPUs, personal digital assistants (PDAs), portable media players, netbooks, laptop computers, electronic book readers, tablet computers, desktop computers, set-top boxes, gaming consoles, a computing device for autonomous vehicles, a surveillance device, and the like. In such embodiments, host device 104 may be connected to DPU 102 over one or more network interfaces 121 via network 108. In other or similar embodiments, host device 104 may be connected to an edge device (not shown) via another network, and the edge device may be connected to DPU 102 via network 108.

In at least one embodiment, the host device 104 executes one or more computer programs. One or more computer programs can be any process, routine, or code executed by the host device 104, such as a host OS, an application, a guest OS of a virtual machine, or a guest application, such as executed in a container. Host device 104 can include one or more CPUs of one or more cores, one or more multi-core CPUs, one or more GPUs, one or more hardware accelerators, or the like.

In at least one embodiment, one or more computer programs reside in a first computing domain (e.g., a host domain), and hardware-accelerated security service 122 and ML detection system 134 reside in a second computing domain (e.g., DPU domain or infrastructure domain) different than the first computing domain. In at least one embodiment, the malicious activity is caused by malware, and hardware-accelerated security service 122 is out-of-band security software in a trusted domain that is different and isolated from the malware. That is, the malware may reside in a host domain, and hardware-accelerated security service 122, being in the trusted domain, can monitor the physical memory to detect the malware in the host domain. In at least one embodiment, DPU 102 includes a direct memory access (DMA) controller (not illustrated in FIG. 1A) coupled to host interface 120. The DMA controller can read the data from host physical memory 148 via host interface 120. In at least one embodiment, the DMA controller reads data from host physical memory 148 using the PCIe technology. Alternatively, other technologies can be used to read data from host physical memory 148.

Although various embodiments described above are directed to embodiments where hardware-accelerated security service 122 and ML detection system 134 are implemented in separate computing devices, including DPU 102 and accelerated AI/MI pipelines 153 (e.g., on a GPU coupled to the DPU), in other embodiments, operations are performed on single DPU 102. In other embodiments, DPU 102 may be any computing system or computing device capable of performing the techniques described herein.

In at least one embodiment, the host device 104 resides in a first computing domain (e.g., a host domain), and hardware-accelerated security service 122 and ML detection system 134 reside in a second computing domain (e.g., DPU domain) different than the first computing domain. In another embodiment, the host device 104 resides in a first computing domain (e.g., a host domain), hardware-accelerated security service 122 resides in a second computing domain (e.g., DPU domain), and ML detection system 134 reside in a third computing domain different than the first and second computing domains.

Figure 1B:
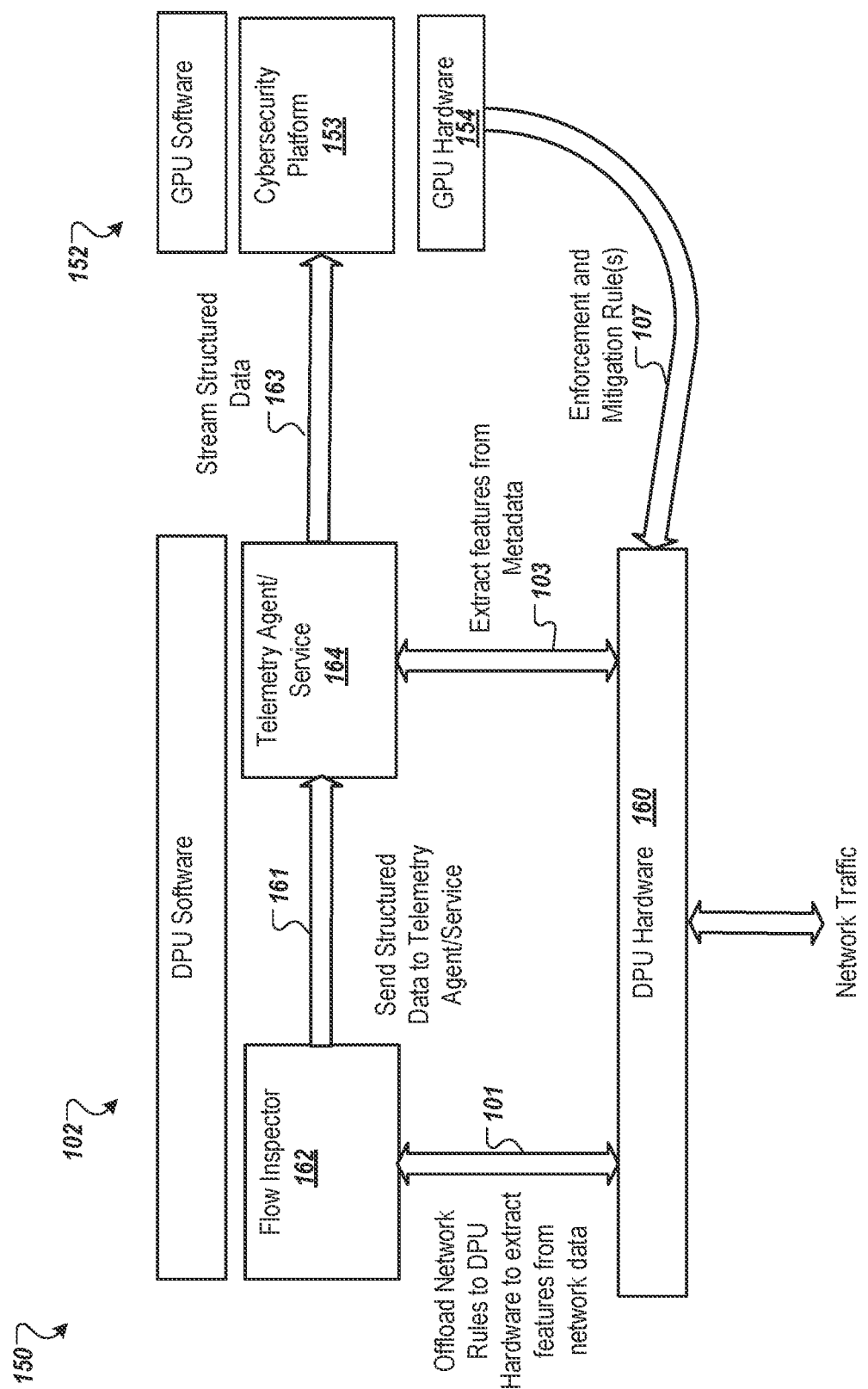
FIG. 1B is a block diagram of an example system architecture, according to at least one embodiment.

FIG. 1B is a block diagram of an example system architecture 180, according to at least one embodiment. The system architecture 180 is similar to system architecture 100, as noted by similar reference numbers, except as set forth below. The system architecture 180 includes an integrated circuit, labeled DPU 102 and GPU 152. The GPU 152 can host a cybersecurity platform, such as the accelerated AI/ML pipeline 153. In at least one embodiment, the accelerated AI/ML pipeline 153 can be part of the NVIDIA MORPHEUS cybersecurity platform. As described above, the NVIDIA Morpheus platform is an AI-enabled, cloud-native cybersecurity platform. The NVIDIA Morpheus platform is an open application framework that enables cybersecurity developers to create AI/ML pipelines for filtering, processing, and classifying large volumes of real-time data, allowing customers to continuously inspect network and server telemetry at scale. The NVIDIA Morpheus platform can provide information security to data centers to enable dynamic protection, real-time telemetry, and adaptive defenses for detecting and remediating cybersecurity threats. In at least one embodiment of FIG. 1B, DPU 102 extracts the network data 101 and the metadata 103 from the DPU hardware 160 of the DPU 102. The network data 101 can be extracted from the network traffic received by the network interfaces of the DPU hardware 160. The metadata 103 can be extracted from one or more registers, counters, or the like, of the DPU hardware 160.

In at least one embodiment, the DPU 102 includes a flow inspector 162 that extracts the network data 101 and a telemetry agent 164 that extracts the metadata 103 from the DPU hardware 160, as described above. The flow inspector 162 can be configured by a configuration file that specifies what type of data should be extracted from the network data 101. The configuration file can specify one or more filters that extract for inclusion or remove from inclusion particular data from the network data 101. The flow inspector 162 can generate a data structure with the extracted data. The data structure can be any type of data structure, such as a struct, an object, a message, or the like. For example, the configuration file can specify that all HTTP traffic be extracted from the network data 101. The configuration file can specify that all traffic on port 80, port 443, and/or port 22 should be extracted from the network data 101 for analysis by the cybersecurity platform. The flow inspector 162 sends structured data 161 to the telemetry agent 164. In at least one embodiment, the telemetry agent 164 can be programmed by a configuration file (same or different configuration file than the flow inspector 162) that specifies what metadata 103 should be extracted from the DPU hardware 160, such as from embedded counters, registers, or the like. For example, the configuration file can specify which values from counters, registers, or the like, should be extracted by the telemetry agent 164 to be streamed with the extracted network data. In at least one embodiment, the telemetry agent 164 combines the metadata 103 with the structured data 161 into streamed structured data 163. The telemetry agent 164 sends the streamed structured data 163 to the GPU 152. In this embodiment, the cybersecurity platform includes one or more accelerated AI/MI pipelines 153 deployed on the GPU hardware 160. The cybersecurity platform can implement the network-anomaly detection system 136.

In at least one embodiment, the DPU hardware 160 includes a data buffer to store the network data 101. In at least one embodiment, the DPU hardware 160 creates a copy of the network data 101 so that it can be filtered by the flow inspector 162 to extract the structured data 161.

In at least one embodiment, a computing system includes the DPU 150 and GPU 152. The DPU 150 includes a network interface, a host interface, a CPU, and an acceleration hardware engine. The DPU 150 has DPU hardware 160, including a network interface, a host interface, a CPU, and an acceleration hardware engine. The DPU 150 also has DPU software, including a hardware-accelerated security service with the flow inspector 162 and telemetry agent 164 to protect a host device from a malicious network attack. As described herein, the hardware-accelerated security service extracts a set of features from first data in network traffic received on the network interface and second data stored in one or more registers in the DPU hardware 160. The GPU 152, or other accelerated pipeline hardware, is coupled to the DPU 160. The GPU 152 determines, using an ML detection system, whether the host device is subject to a malicious network attack based on the set of features. The GPU 152 sends an enforcement rule to the DPU 150 responsive to a determination that the host device is subject to a malicious network attack.

In at least one embodiment, the hardware-accelerated security service (flow inspector 162 and telemetry agent 164) can extract first feature data from the network traffic and second feature data from one or more registers in the DPU hardware 160. The hardware-accelerated security service (flow inspector 162 and telemetry agent 164) can combine the first feature data and the second feature data into the set of features. The hardware-accelerated security service can send the set of features to the GPU 152 (e.g., accelerated pipeline hardware 153) to determine whether the host device is subject to a malicious network attack. Responsive to a determination by the GPU 152 (e.g., or accelerated pipeline hardware 153) that the host device is subject to the malicious network attack, the GPU 152 (e.g., or accelerated pipeline hardware 153) can send the enforcement rule 107 to the DPU 150. The DPU 150 can perform an action, associated with the enforcement rule 107, on subsequent network traffic directed to the host device.

In at least one embodiment, the host device resides in a first computing domain, and the DPU software resides in a second computing domain different than the first computing domain. The ML detection system can reside in the second computing domain or a third computing domain different than the first computing domain and the second computing domain.

Figure 2:
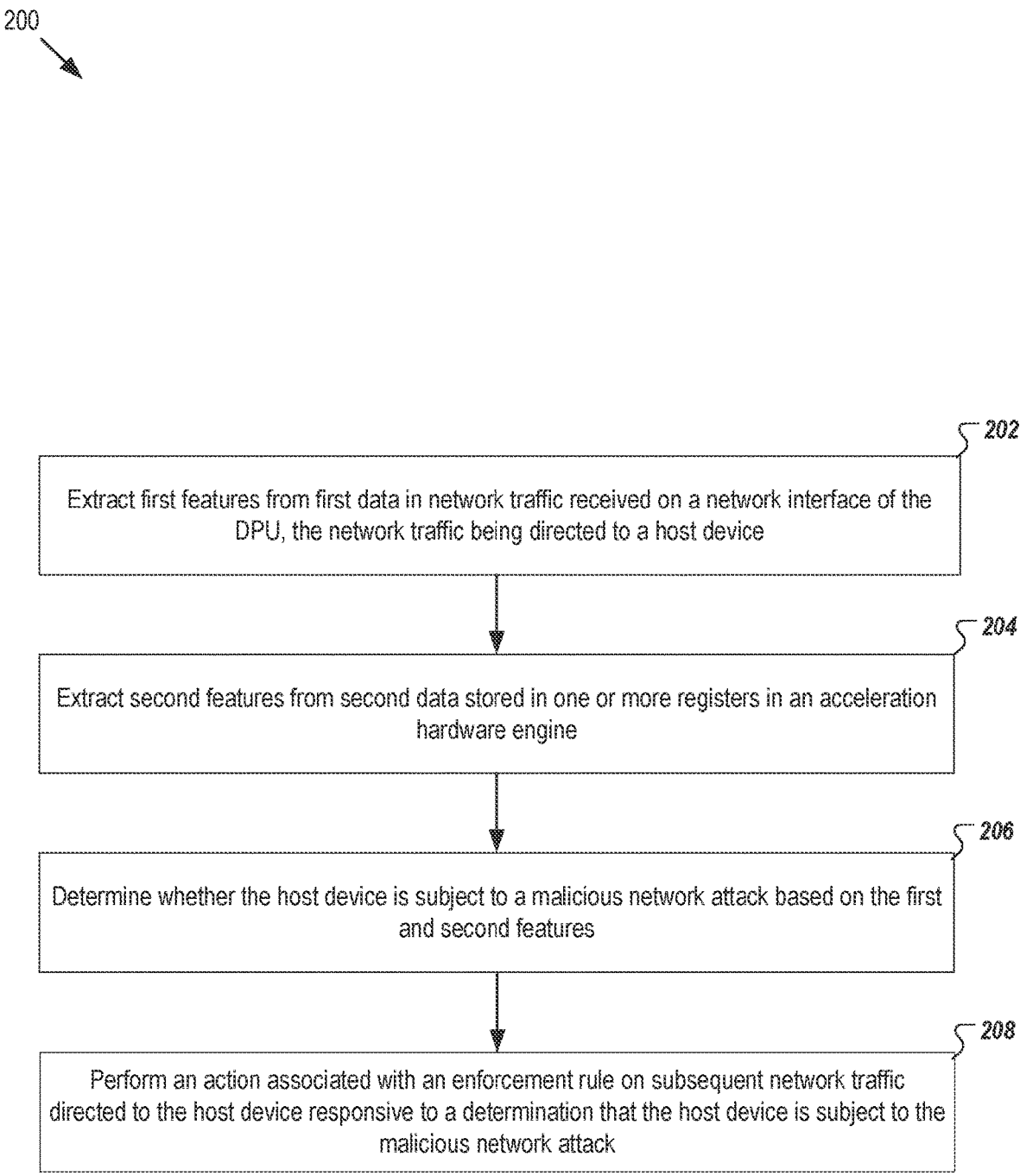
FIG. 2 is a flow diagram of an example method of detecting a malicious network attack on a host device, according to at least one embodiment.

FIG. 2 is a flow diagram of an example method 200 of detecting a malicious network attack on a host device, according to at least one embodiment. In at least one embodiment, method 200 may be performed by processing the logic of DPU 102. In at least one embodiment, method 200 may be performed by processing logic of DPU 102 and processing logic of accelerated AI/ML pipeline 153. The processing logic can be a combination of hardware, firmware, software, or any combination thereof. Method 200 may be performed by one or more data processing units (e.g., DPUs, CPUs, and/or GPUs), including (or communicating with) one or more memory devices. In at least one embodiment, method 200 may be performed by multiple processing threads, each thread executing one or more individual functions, routines, subroutines, or operations of the method. In at least one embodiment, processing threads implementing method 200 may be synchronized (e.g., using semaphores, critical sections, and/or other thread synchronization logic). Alternatively, processing threads implementing method 200 may be executed asynchronously with respect to each other. Various operations of method 200 may be performed differently than the order shown in FIG. 2. Some operations of the methods may be performed concurrently with other operations. In at least one embodiment, one or more operations shown in FIG. 2 may not always be performed.

Referring to FIG. 2, the processing logic extracts first features from first data in network traffic received on a network interface (block 202). The first data is network data directed to a host device. The processing logic extracts second features from second data stored in one or more registers in an acceleration hardware engine (block 204). The processing logic uses an ML detection system to determine whether the host device is subject to a malicious network attack based on the first and second features (block 206). The processing logic performs an action associated with an enforcement rule on subsequent network traffic directed to the host device from the second device, responsive to a determination that the host device is subject to the malicious network attack (block 208).

In at least one embodiment, the processing logic extracts first feature data from the network traffic and second feature data from the one or more registers in the acceleration hardware engine. The processing logic combines the first feature data and the second feature data into a set of features. The processing logic sends the set of features to an accelerated pipeline hardware. The accelerated pipeline hardware hosts the ML detection system. The processing logic receives the enforcement rule from the accelerated pipeline hardware responsive to a determination by the accelerated pipeline hardware that the host device is subject to a malicious network attack based on the plurality of features.

In at least one embodiment, the processing logic tokenizes the first feature data into tokens and extracts numeric features from the second feature data. The ML detection system includes a classification model trained to classify the first and second feature data as malicious or benign based on the tokens and the numeric features.

In another embodiment, the classification model includes an embedding layer, an LSTM layer, and a neural network layer. The embedding layer can receive the tokens as an input sequence of tokens and generate an input vector based on the input sequence of tokens. The LSTM layer can be trained to generate an output vector based on the input vector. The neural network layer can be trained to classify the first and second feature data as malicious or benign using the output vector from the LSTM layer and the numeric features of the second feature data.

In at least one embodiment, the host device resides in a first computing domain, and the DPU and the ML detection system reside in a second computing domain different than the first computing domain. In at least one embodiment, the host device resides in a first computing domain, the DPU resides in a second computing domain different than the first computing domain, and the ML detection system resides in a third computing domain different than the first computing domain and the second computing domain.

Network-Anomaly Detection

As described above, one type of malicious activity is caused by malicious network attacks, such as through network traffic on specified ports. In at least one embodiment, hardware-accelerated security service and the cybersecurity platform are part of an active system for detecting malicious network attacks on a host device by constantly monitoring the network traffic for anomalies by leveraging accelerated hardware for feature extraction from the network traffic and accelerated hardware for anomaly detection. The hardware-accelerated security service can extract specific types of network data and metadata from the underlying acceleration hardware and stream this information to a GPU for ML-based anomaly detection. The hardware-accelerated security service allows live-network analysis (or real-time data analysis) of the network traffic and provides mitigation or enforcement to stop the network traffic that is classified as malicious immediately. In at least one embodiment, a DPU can process a copy of the network data, extract features or indications from network data, and extract features from the DPU hardware itself before sending it to an ML detection system on accelerated hardware, such as a GPU coupled to the DPU. The DPU can collect real-time data using out-ofband filtering using the hardware-accelerated security service. The DPU can integrate a network-anomaly detection system with the real-time data collected by hardware-accelerated security service to detect malicious network activity in the network traffic and immediately take enforcement, mitigation, or remedial actions in response.

Figure 3A:
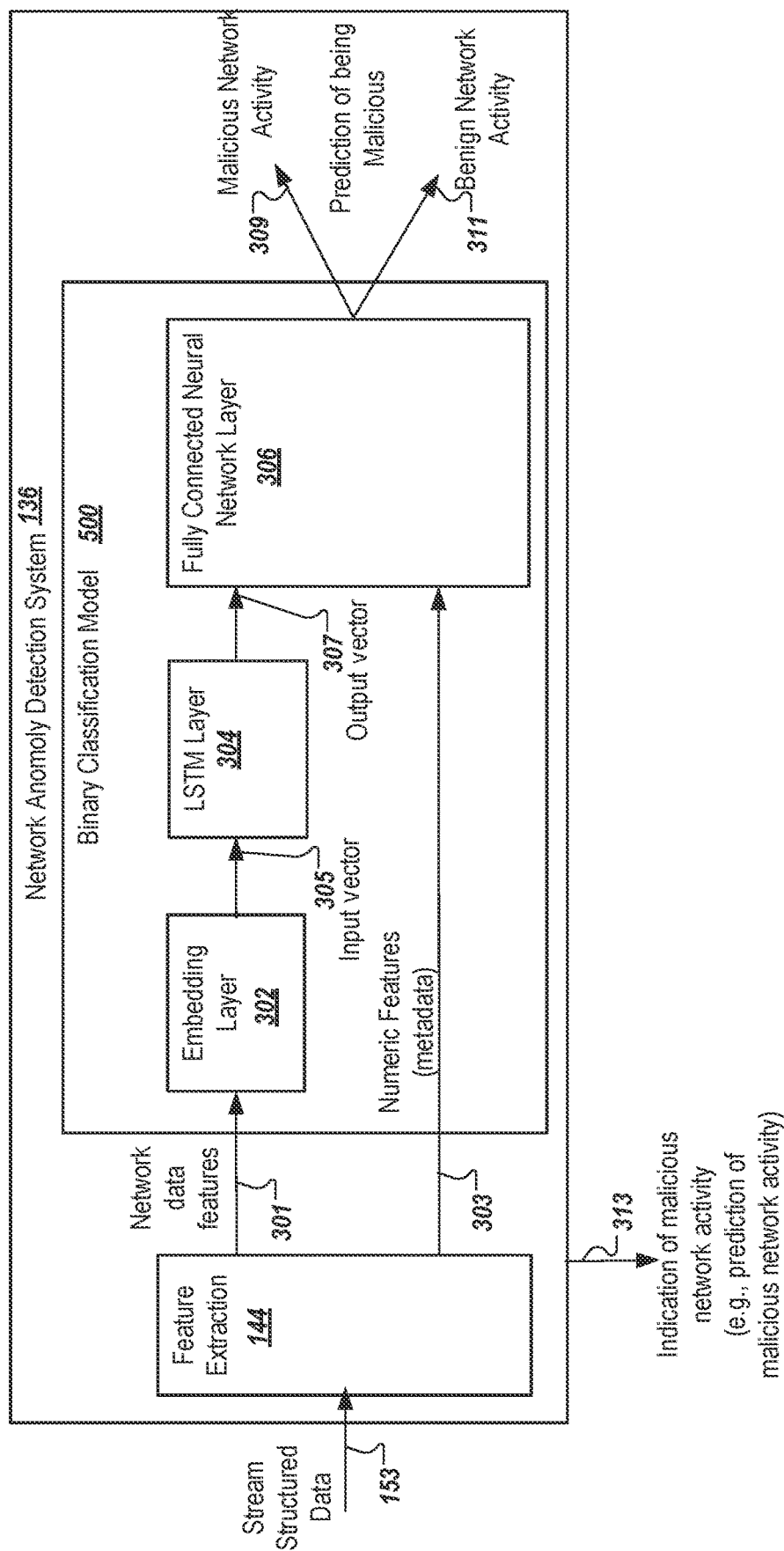
FIG. 3A is a diagram of an example classification model, according to at least one embodiment.

FIG. 3A is a block diagram of an example network-anomaly detection system 136, according to at least one embodiment. Network anomaly detection system 136 includes feature extraction logic 144 and binary classification model 300 trained to classify network traffic as malicious benign using a set of features. Feature extraction logic 144 receives streamed structured data 163 (or streamed data 105), as described above, extracts first feature data 301 from the streamed structured data 163, and extracts second features data 303 (e.g., numeric features of the metadata) from one or more registers in the acceleration hardware engine. For binary classification model 300, feature extraction logic 144 extracts features and tokenizes the features into token features. Feature extraction logic 144 can provide the tokens and numeric features to binary classification model 300, which is trained to classify the network traffic as malicious 309 or benign 311 using the tokens and numeric features.

In at least one embodiment, binary classification model 300 includes an embedding layer 302, an LSTM layer 304, and a fully connected neural network layer 306. Embedding layer 302 can receive tokens as an input sequence of tokens representing the extracted network data. Embedding layer 302 can generate an input vector 305 based on the input sequence of tokens. Input vector 305 can represent the words network data in a vector space used by LSTM layer 304. LSTM layer 304 can receive input vector 305 and generate an output vector 307 based on input vector 305. Fully connected neural network layer 306 can receive output vector 307 from LSTM layer 304 and numeric features (metadata). Fully connected neural network layer 306 is trained to classify the network data and metadata as a malicious 309 or benign 311 using output vector 307 from the LSTM layer 5304 and the numeric features of the metadata. In at least one embodiment, fully connected neural network layer 306 can determine a level of confidence that the network activity corresponds to the malicious class. The level of confidence can be a prediction percentage of being malicious. For example, if the level of confidence satisfies a level of confidence criterion (e.g., a confidence threshold), fully connected neural network layer 306 can classify the network activity as malicious 309.

In at least one embodiment, network-anomaly detection system 136 can output an indication of a malicious network activity 313 responsive to the network activity being classified as malicious 309. The indication of a malicious network activity 313 can specify the confidence level that the network activity corresponds to the malicious class. Alternatively, network-anomaly detection system 136 can output an indication of a benign network activity responsive to the network activity being classified as benign 311. The indication of benign network activity can indicate a level of confidence that the network activity is benign.

Figure 3B:
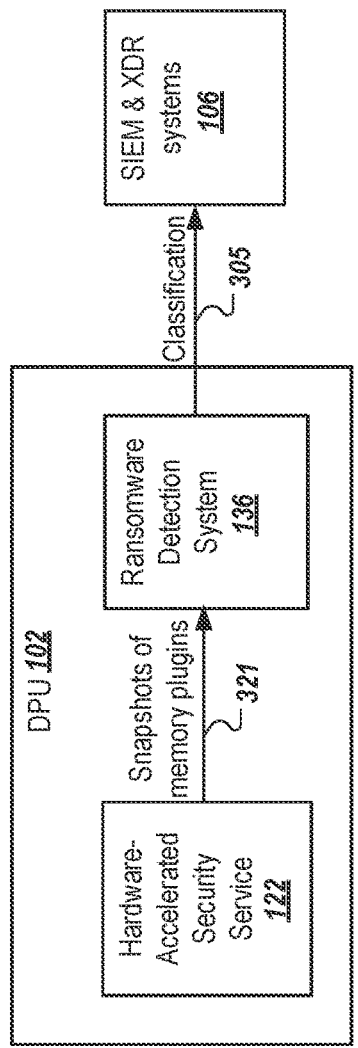
FIG. 3B is a block diagram of an example system architecture for the ransomware detection system, according to at least one embodiment.
Figure 3C:
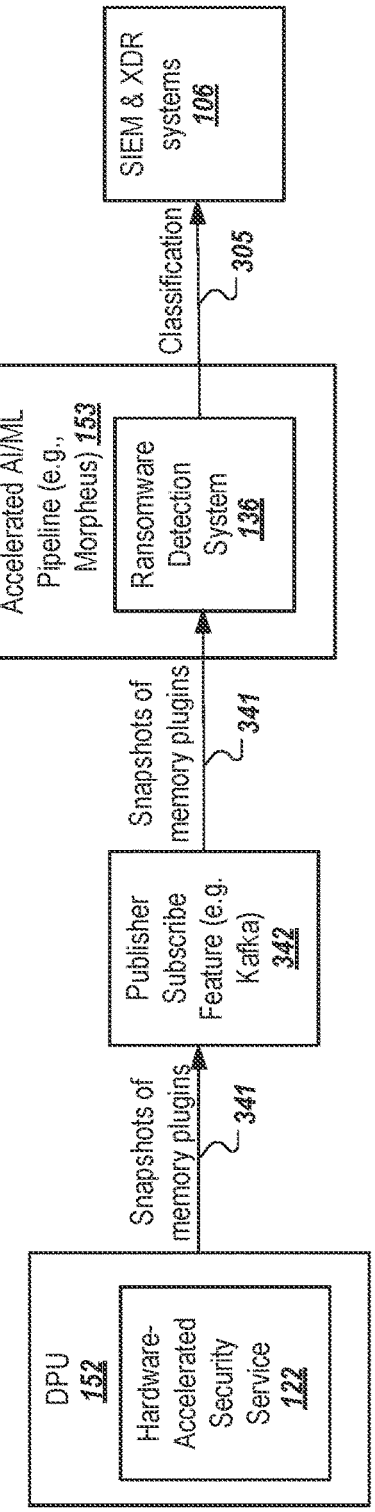
FIG. 3C is a block diagram of an example system architecture for the ransomware detection system, according to at least one embodiment.

As described above, ML detection models, such as the binary classification model 300, can be deployed in network-anomaly detection system 136 residing in GPU 152 or other hardware accelerated hardware, as described in more detail with respect to FIG. 3B, or network-anomaly detection system 136 residing in accelerated AI/ML pipeline 153, as described in more detail with respect to FIG. 3C.

FIG. 3B is a block diagram of an example system architecture 320 for the network-anomaly detection system 136, according to at least one embodiment. In system architecture 320, DPU 102 hosts hardware-accelerated security service 122 and network-anomaly detection system 136. Hardware-accelerated security service 122 extracts feature data 321 as described above with respect to FIG. 3A, and sends, or otherwise makes available, the feature data 321 to network-anomaly detection system 136. Network anomaly detection system 136, using binary classification model 300, classifies the network activity as malicious or benign and sends an enforcement rule 323 to the hardware-accelerated security service 122, such as immediately blocking subsequent network activity by the attacker. In at least one embodiment, the network-anomaly detection system 136 can also output an indication of malicious network activity 313 to SIEM or XDR system 106 for further actions by SIEM or XDR system 106. SIEM or XDR system 106 can monitor and show results of classifications of ransomware, such as on a dashboard displayed to a user or operator of SIEM or XDR system 106.

In another embodiment, the hardware-accelerated security service 122 and network-anomaly detection system 136 can reside on a convergence card that includes both DPU hardware and GPU hardware. The convergence card can be a single integrated circuit with the DPU and GPU hardware. In another embodiment, the convergence card can include multiple integrated circuits to implement the functionality of the DPU and the GPU, as described herein.

In various embodiments, the data extraction and the data analysis are done by accelerated hardware. The accelerated hardware can be used to extract feature data from the network traffic, and accelerated hardware can be used to perform ML-based anomaly detection, as described herein. The accelerated hardware can also provide enforcement rules in response to detecting anomalies to protect the host device from malicious network activity. The accelerated hardware can structure the data in any format the cybersecurity platform can receive. The structure can be a message, a struct, or the like. The feature data may not necessarily be formatted in a common format or be serialized to send to the cybersecurity platform. In other embodiments, the accelerated hardware can use a common format or serialize the data to send to the cybersecurity platform.

FIG. 3C is a block diagram of an example system architecture 340 for the ransomware detection system, according to at least one embodiment. In system architecture 340, DPU 102 hosts hardware-accelerated security service 122, and accelerated AI/ML pipeline 153 hosts network-anomaly detection system 136. Hardware-accelerated security service 122 extracts feature data 321 as described above with respect to FIG. 3A, and sends, or otherwise makes available, the feature data 321 to a publisher subscribe feature 342 (e.g., Kafka). Publisher subscribe feature 342 sends, or otherwise makes available, the feature data 321 to network-anomaly detection system 136. Network anomaly detection system 136, using binary classification model 300, classifies the network activity as malicious or benign and sends an enforcement rule 343 to the publisher subscribe feature 342. The publisher subscribe feature 342 can send the enforcement rule 343 to the hardware-accelerated security service 122. In at least one embodiment, the network-anomaly detection system 136 can output an indication of malicious network activity 313 to SIEM or XDR system 106 for further actions by SIEM or XDR system 106.

Figure 4:
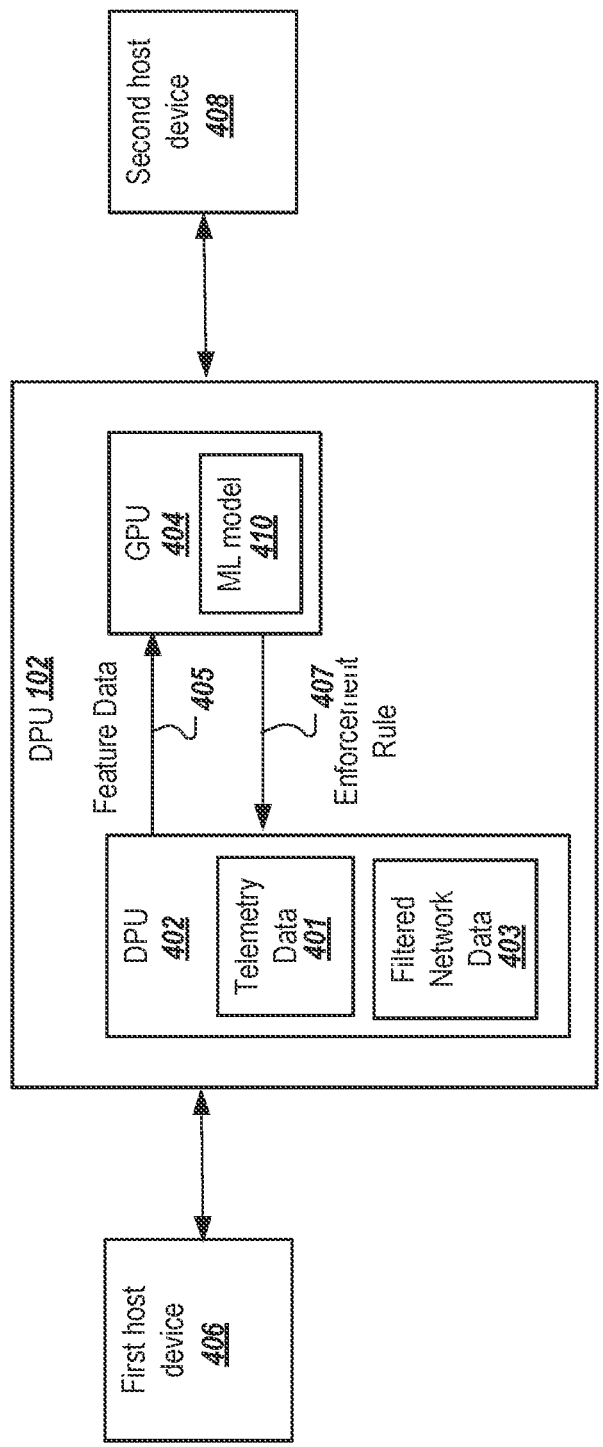
FIG. 4 is a block diagram of a computing system with a DPU and a GPU coupled between a first host device and a second host device, according to at least one embodiment.

FIG. 4 is a block diagram of a computing system 400 with a DPU 402 and a GPU 404 coupled between a first host device 406 and a second host device 408, according to at least one embodiment. In at least one embodiment, the computing system 400 and the first host device 406 reside in a data center, and the second host device 408 is a malicious host attempting to attack the first host device 406. In at least one embodiment, the GPU 404 includes a machine learning (ML) model 410 that identifies potentially malicious network activity between the first host device 406 and the second host device 408. The computing system 400 can be a networking device, an infrastructure device, or the like that performs a networking function, such as the functions performed by hubs, repeaters, switches, routers, bridges, gateways, modems, or network interfaces. Examples of network devices can include, but are not limited to, access points, routers, Wi-Fi® access points, Wi-Fi® routers, switches, hubs, bridges, modems, DPUs, SmartNICs, active cables, or the like. In at least one embodiment, the computing system 400 operates on one or more layers of the open systems interconnection ("OSI") model. For example, computing system 400 may, in some cases, corresponds to a hub that connects computing devices operating at level one of the OSI model. In another embodiment, computing system 400 is a bridge or switch processes traffic at OSI layer two. In another embodiment, computing system 400 is a router operating at OSI layer three. In some embodiments, computing system 400 operates at multiple OSI levels.

In at least one embodiment, the operation of computing system 400 at a layer of the OSI model comprises performing networking functions related to that layer and collecting telemetry data 401 pertinent to the performance of those functions. This telemetry data 401 can comprise metrics, log data, or other information that describes events, states, or operations associated with the computing system 400 and the performance of a relevant function. Note that in at least some cases and embodiments, the computing system 400 that operates on a particular layer of the OSI model may collect telemetry data 401 relevant to its operation on that layer more efficiently than devices that operate on other layers. In addition to collecting telemetry data 401, the DPU 402 collects and filters network traffic to obtain filtered network data 403. The filtered network data 403 can be HTTP traffic, such as network data on a specified port. The filtered network data 403 and the telemetry data 401 can be combined and sent as feature data 405 to the GPU 404 for network-anomaly detection. The GPU 404 uses the ML model 410 to identify the network traffic as malicious using the feature data 405. In response to identifying malicious network traffic, the GPU 404 sends an enforcement rule 407 to the DPU 402 to protect the first host device 406 from the malicious network traffic by the second host device 408.

In at least one embodiment, the computing system 400 collects and processes telemetry data 401 and filtered network data 403, which are collected on-the-fly by the computing system 400. For example, such data may be collected by an application-specific integrated circuit ("ASIC") that performs the device's networking function. The telemetry data 401 can, using this technique, be rapidly read from the device's registers or other internal memory. Examples of telemetry data can include, but are not limited to, latency histograms, receive counters, send counters, metrics associated with encapsulation or de-encapsulation, queue occupancy, queue length, and power-level usage indicators. Note that in some cases, attempts to utilize a device to perform crypto-currency mining, malicious, or other undesired usage patterns may result in increased power consumption by the computing system 400.

In at least one embodiment, computing system 400 comprises a networking component, the ML model 410, and a database. The networking component can include circuitry and other computing facilities, such as processors, memory, and processor-executable instructions used to perform one or more network-related functions of the computing system 400, such as sending or receiving data. This networking function may comprise sending or receiving data between the first host device 406 and the second host device 408. In at least one embodiment, the second host device 408 is considered a source host, and the first host device 406 can be considered a destination host. A source host may be a device, such as a computing device that transmits data over a network. Similarly, a destination host may be a device, such as a computing device that receives data sent over the network.

In at least one embodiment, the ML model 410 can analyze network traffic and identify undesired data or network traffic patterns. The ML model 410 can implement one or more of a variety of machine learning methods, techniques, and algorithms. These can include, but are not limited to, supervised learning, unsupervised learning, deep learning, and reinforcement learning. Embodiments of an ML model 410 may, for example, implement algorithms for regression, clustering, instance-based algorithms, regularization algorithms, artificial neural networks, convolutional neural networks, recurrent neural networks, long short-term memory networks, decision-trees, deep belief networks, gradient boosting, XGBoost, support vector machines, Bayesian techniques, random forests, and so forth. It will be appreciated that these examples are intended to be illustrative. As such, they should not be construed in a manner that would limit potential embodiments to only those that incorporate the specific examples provided.

In at least one embodiment, the ML model 410 is trained to identify undesired usage of computing system 400. Such usage can include using computing system 400 in a manner that causes or facilitates harm, such as harm to the operation of a computer or computer network, harmful disclosure of information, harmful transmission of data, etc. In at least one embodiment, the ML model 410 is trained to identify harmful usage of computing system 400 using a dataset of examples. These examples can include network telemetry, network data packets, series of network data packets, or other information. In at least one embodiment, these examples are labeled to indicate whether or not a particular example is associated with undesired data or traffic patterns. As appropriate to the machine learning model, various techniques may use labeled or unlabeled data to train the model.

In at least one embodiment, the computing system 400 includes a database that can maintain information related to ML model 410. For example, the database can maintain datasets, as just described, that are used to train, retrain, or refine the training of an ML model 410. For example, in at least one embodiment, a set of example data patterns indicative of malicious, unauthorized, or otherwise undesired network traffic patterns, is maintained in database 112. This data may be updated or supplemented as new attack patterns are discovered. Therefore, the computing system 400 may include circuitry, processor-executable instructions, or other computing facilities for receiving updated data and storing the data in the database.

In at least one embodiment, computing system 400 includes circuitry, processor-executable instructions, or other computing facilities for training, retraining, or refinement of the ML model 410 using such updated data from the database. For example, after a new attack pattern is discovered, the database may be updated in response to a request from an external source, such as a command from a device that performs an administrative function. After the update, the computing system 400 initiates a training procedure, using the data stored in the database, to train, retrain, or refine the training of ML model 410. The ML model 410 may then have improved capabilities to detect network patterns that reflect characteristics similar to those of the new attack pattern or those that reflect characteristics similar to other, previously known patterns associated with undesired network usage.

In at least one embodiment, the database is omitted from the computing system 400. In some embodiments, an external database is used, and training samples are transmitted to the computing system 400 and used by the computing system 400 to train, retrain, or refine training of ML model 410. In other embodiments, training, retraining, or refinement of ML model 410 is performed externally, and an ML model 410 is updated to reflect the new training. For example, in at least one embodiment, a set of weights or other parameters, such as the weights or parameters used in an artificial neural network, are transmitted to computing system 400 and used to update corresponding weights or parameters in ML model 410.

In at least one embodiment, computing system 400 operates on one or more selected layers of the OSI model, collects data pertinent to networking operations performed on one or more selected layers, and analyzes the data using an ML model 410 to identify a suspicious or unauthorized network traffic pattern. For example, an ML model 410 might infer, based on analyzing data from the OSI layers, that an observed network traffic pattern appears to be a denial-of-service ("DoS") attack or other malicious use of computing system 400. The computing system 400 can then initiate a response to the detected network traffic pattern. By performing analysis on computing system 400, data pertinent to a particular OSI layer might be analyzed and an undesired use of computing system 400 detected more quickly or more efficiently than might be the case if the analysis were performed remotely. This approach may also, in some embodiments, convey an advantage by permitting analysis of data at a particular OSI layer to be analyzed without requiring transmission of that data to another device or otherwise facilitating more rapid analysis of and response to the data.

Figure 5:
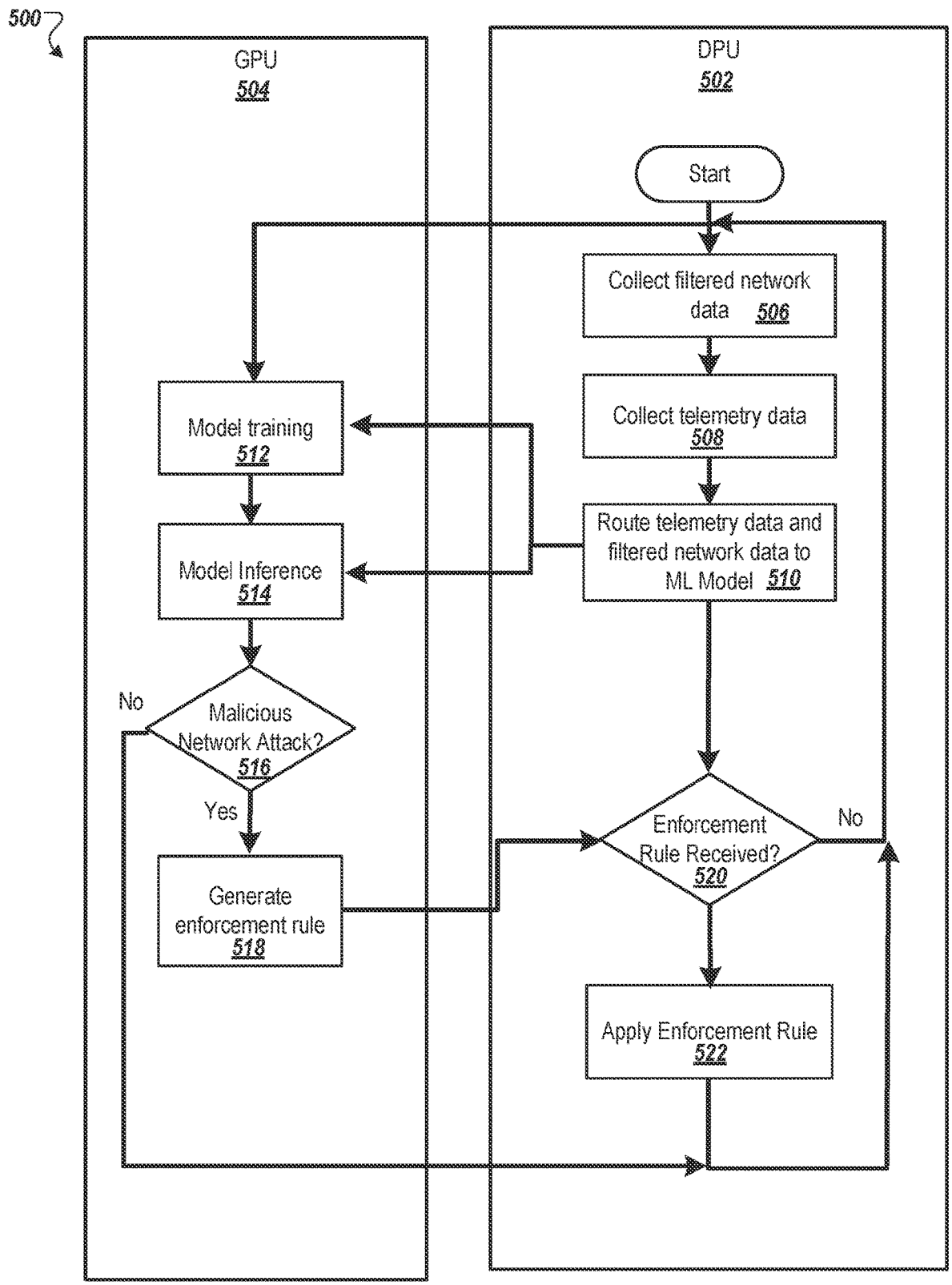
FIG. 5 illustrates a process flow for malicious network attack detection by a machine learning model, according to at least one embodiment.

FIG. 5 illustrates an example process flow 500 for malicious network attack detection by a machine learning model, according to at least one embodiment. In the example process flow 500, a DPU 502 can perform various operations, and a GPU 504 can perform various operations. At 506, the DPU 502 collects filtered network data as described above. The filtered network data can be collected by the hardware-accelerated security service as described above, such as a flow inspector. At 508, the DPU 502 collects telemetry data associated with networking operations performed by the DPU 502. In at least one embodiment, telemetry data is collected by a telemetry agent. This filtered network data and telemetry data is then, in at least one embodiment, routed at 510 to a machine learning model on the GPU 504. In at least one embodiment, the filtered network data and the telemetry data are used to perform training of the machine learning model at 512. This can include retraining or refining a trained model or training a new or additional machine learning model. In at least one embodiment, filtered network data and the telemetry data collected at 206 and 208 are used to perform, at 514, inference or other analysis consistent with the type of model used to identify a potentially malicious network attack as manifest in undesired traffic patterns. At 516, if the malicious network attack is detected, the GPU 504 generates an enforcement rule at 518 to prevent the network traffic for the given malicious network attack. The enforcement rule is routed at 518 to the DPU 502. The enforcement rule can include a mitigating action, a preventative action, a remedial action, or the like. The enforcement rule can be used to prevent the traffic from interfering with the operation of the DPU 502 or a host device to which the malicious network attack is directed. For example, in at least one embodiment, the machine learning model at 514 identifies an undesired usage of the DPU 502 and may further be used to identify the usage characteristics, such as the network ports associated with the undesired usage. The DPU 502 can determine if the enforcement rule is received from the GPU 504 at 520. If the enforcement rule is received at 520, the DPU 502 can apply the enforcement rule to prevent a malicious network attack. The DPU 502 can perform one or more actions to mitigate, prevent, or remediate the malicious network attack. Examples of potential enforcement actions can include, but are not necessarily limited to, sending a notification describing the inference, restricting usage of the network device, shutting down the network device, slowing the network device, applying restrictive measures to traffic associated with a network traffic pattern, and so on. It will be appreciated that these examples are intended to be illustrative rather than limiting. If an enforcement rule is not received at 520, the DPU 502 can continue to collect filtered network data at 506.

After a determination is made, information about the determination is fed, in at least one embodiment, back to model training at 512. This can include information indicating whether or not a network traffic pattern (or other data or condition) that was classified as undesired by the machine learning model is confirmed as undesired or not being undesired. This information can then be used in model training at 512 to refine the model's understanding of potentially malicious or otherwise undesired network traffic patterns and approve the model's ability to recognize and distinguish undesired behavior from behavior that conforms to an intended usage of the DPU 502.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within range unless otherwise indicated herein, and each separate value is incorporated into the specification as if it were individually recited herein. Use of the term "set"

(e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of a set of A and B and C. For instance, in the illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in at least one embodiment, comprises multiple non-transitory computer-readable storage media, and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors—for example, a non-transitory computer-readable storage medium stores instructions, and a main CPU executes some of the instructions while a GPU executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

The terms "coupled" and "connected," along with their derivatives, may be used in the description and claims. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other but yet still co-operate or interact with each other.

Unless specifically stated otherwise, it may be appreciated that throughout specification terms such as "processing," "computing," "calculating," "determining," or like, refer to action and/or processes of a computer or computing system or similar electronic computing devices, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes for carrying out instructions in sequence or parallel, continuously or intermittently. The terms "system" and "method" are used herein interchangeably insofar as a system may embody one or more methods, and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or interprocess communication mechanism.

Although the discussion above sets forth example implementations of described techniques, other architectures may be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computing system comprising:
   a graphics processing unit (GPU) comprising a cybersecurity platform with one or more accelerated machine learning pipelines; and
   a data processing unit (DPU) coupled to the GPU, wherein the DPU comprises:
      a network interface operatively coupled to a network, the network interface to receive network traffic directed to a host device from a second device over the network;
      a host interface operatively coupled to the host device, the DPU to send the network traffic to the host device over the host interface;
      an acceleration hardware engine operatively coupled to the network interface and the GPU, wherein the acceleration hardware engine is to host a hardware-accelerated security service to:
         extract first feature data from the network traffic;
         extract second feature data from telemetry data generated and stored by the acceleration hardware engine, wherein the telemetry data is associated with operations of the acceleration hardware engine;
         send the first feature data and the second feature data to the cybersecurity platform to determine whether the host device is subject to a malicious network attack using the one or more accelerated machine learning pipelines;
         receive an enforcement rule from the cybersecurity platform responsive to a determination by the cybersecurity platform that the host device is subject to the malicious network attack; and
         perform an action, associated with the enforcement rule, on subsequent network traffic directed to the host device from the second device.

2. The computing system of claim 1, wherein the cybersecurity platform is to:
   receive the first feature data and the second feature data from the hardware-accelerated security service;
   determine whether the host device is subject to the malicious network attack using a classification model of the one or more accelerated machine learning pipelines, the classification model being trained to classify the first and second feature data as malicious or benign; and
   send the enforcement rule to the hardware-accelerated security service responsive to the determination that the host device is subject to the malicious network attack.

3. The computing system of claim 2, wherein the cybersecurity platform comprises feature extraction logic to tokenize the first feature data into tokens and extract numeric features from the second feature data, and wherein the classification model comprises:
   an embedding layer to receive the tokens as an input sequence of tokens and generate an input vector based on the input sequence of tokens;
   a Long Short-Term Memory (LSTM) layer trained to generate an output vector based on the input vector; and
   a neural network layer trained to classify the first and second feature data as malicious or benign using the output vector from the LSTM layer and the numeric features of the second feature data.

4. The computing system of claim 1, wherein the DPU is a programmable data center infrastructure on a chip.

5. The computing system of claim 4, further comprising:
   a central processing unit (CPU) operatively coupled to the acceleration hardware engine and the GPU, wherein the acceleration hardware engine to handle network data path processing, wherein the CPU is to control path initialization and exception processing.

6. The computing system of claim 1, wherein the host device resides in a first computing domain, wherein the hardware-accelerated security service and the cybersecurity platform reside in a second computing domain different than the first computing domain.

7. The computing system of claim 1, wherein the host device resides in a first computing domain, wherein the hardware-accelerated security service resides in a second computing domain different than the first computing domain, and wherein the cybersecurity platform resides in a third computing domain different than the first computing domain and the second computing domain.

8. The computing system of claim 1, wherein the telemetry data is stored in at least of i) one of one or more registers of the acceleration hardware engine or ii) a hardware counter of the acceleration hardware engine.

* * * * *